March 31, 1931.  J. B. DILLARD  1,798,314

PROCESS OF MAKING SPIRAL REAMERS

Filed March 3, 1926

INVENTOR.
James B. Dillard
BY
Fay, Oberlin & Fay
ATTORNEYS.

Patented Mar. 31, 1931

1,798,314

UNITED STATES PATENT OFFICE

JAMES B. DILLARD, OF SHAKER HEIGHTS VILLAGE, OHIO, ASSIGNOR TO THE CLEVELAND TWIST DRILL COMPANY, OF CLEVELAND, OHIO, A CORPORATION OF OHIO

PROCESS OF MAKING SPIRAL REAMERS

Application filed March 3, 1926. Serial No. 91,940.

This improvement relates to reamers and the like, and more particularly to tools having twisted or spiral blades. While it has long been a known procedure to make straight-blade reamers by building strips of high speed steel into prepared slots in a soft steel core, it has been thought that irregular blade tools could only be made of one-piece blanks. In accordance with the present invention, however, spiral blade tools may be readily made from composite materials, thereby attaining the possibility of employing high grade or high speed steels for cutting-edges without the difficulty in working and the high cost of using integral blanks of such material.

To the accomplishment of the foregoing and related ends, the invention, then, consists of the steps and the means hereinafter fully described, and particularly pointed out in the claims, the annexed drawing and the following description setting forth in detail certain steps and means embodying the invention, such disclosed steps and means constituting, however, but one of various ways in which the principle of the invention may be used.

Figure 1:
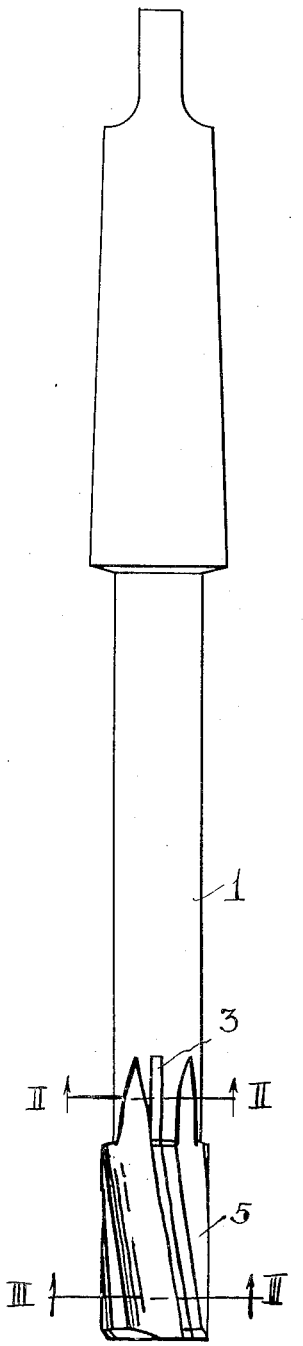
Figure 2:
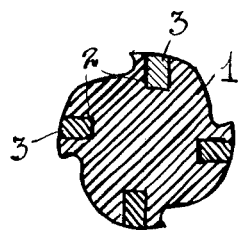
Figure 3:
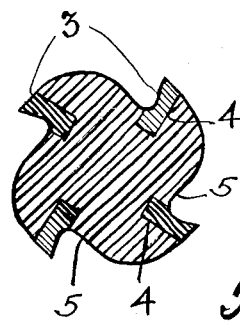

In said annexed drawing:

Fig. 1 is a side elevation of a tool in accordance with the present invention; Fig. 2 is a transverse section of such a tool on the plane indicated by the line II—II of Fig. 1; and Fig. 3 is a similar view taken on the plane indicated by the line III—III of Fig. 1.

In proceeding in accordance with the present invention, I prepare a core blank 1 of common, soft or machine steel to general dimension and cylindrical form, unless stock material of suitable form and dimension be had, and I cut therein longitudinal slots 2, preferably somewhat under-cut or dovetailed, at suitable spaced circumferential distances in accordance with the number of blades desired. Blades 3 of a high grade or high speed steel of straight form and approximately to dimension are prepared and inserted into the longitudinal slots in the core blank, and in cases where necessary are secured by crowding or upsetting the core metal against the blades at suitable intervals with a punch or appropriate means. The tool is now gripped in a twisting device of usual or preferred form and twisted, cold, or after softening by heating, in accordance with the size and character, to bring the blades to the angle desired. I prefer next to heat the tool to suitable temperature for heat-treating the metal and a the same time I effectively secure the blades by brazing or the like, a flux as necessary and brazing metal or a high melting point solder or the like being provided so as to fill the capillary spaces left between the blades and core metal. Upon now cooling or quenching by air-blast or oil or other liquid as preferred, the steel is given the hardness required and the brazing material or the like is also set. I now ordinarily mill flutes or grooves 5 between the the blades, rounding out the core metal directly at the front of each blade. In some cases the cutting of the flutes may be done in part or in whole before the hardening and brazing. The tool is finally finished by grinding to size and shaping the end, and cleaning out the flutes if necessary, and grinding back the heel of the blade if desired.

Tools produced in this manner are provided with the amount of twist desired, and at the same time the blades are virtually integral with the core and have all the advantages of a high grade cutting edge without the difficulty and cost of working such material into shape out of integral stock.

Other modes of applying the principle of my invention may be employed instead of that explained, change being made as regards the steps and means herein disclosed, provided the steps or means stated by any of the following claims or the equivalent of such stated steps or means be employed.

I therefore particularly point out and distinctly claim as my invention:—

1. A process of making reamers and the like, which comprises cutting longitudinal slots at spaced intervals on a core of common steel, inserting high grade steel blades in such slots, and then in any desired order twisting the assemblage and brazing the blades in place, and finally finishing the tool.

2. A process of making reamers and the like, which comprises forming longitudinal slots at spaced intervals on a core of steel, placing high grade steel blades in such slots, and then in any desired order twisting the assemblage and securing the blades in place.

Signed by me this 26" day of February, 1926.

JAMES B. DILLARD.